(12) United States Patent
Nambara

(10) Patent No.: US 10,088,677 B2
(45) Date of Patent: Oct. 2, 2018

(54) HEAD-UP DISPLAY DEVICE AND ILLUMINATION UNIT FOR HEAD-UP DISPLAY DEVICE

(71) Applicant: DENSO CORPORATION, Kariya, Aichi-pref. (JP)

(72) Inventor: Takahiro Nambara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 3 days.

(21) Appl. No.: 15/312,807

(22) PCT Filed: Jun. 1, 2015

(86) PCT No.: PCT/JP2015/002759
§ 371 (c)(1),
(2) Date: Nov. 21, 2016

(87) PCT Pub. No.: WO2015/190060
PCT Pub. Date: Dec. 17, 2015

(65) Prior Publication Data
US 2017/0329133 A1    Nov. 16, 2017

(30) Foreign Application Priority Data

Jun. 9, 2014 (JP) .................................. 2014-118742

(51) Int. Cl.
*G09G 5/00* (2006.01)
*G02B 27/01* (2006.01)
*B60K 35/00* (2006.01)

(52) U.S. Cl.
CPC .......... *G02B 27/0101* (2013.01); *B60K 35/00* (2013.01); *B60K 2350/2034* (2013.01);
(Continued)

(58) Field of Classification Search
CPC ...................... G02B 27/0101; G02B 2027/014
See application file for complete search history.

(56) References Cited

U.S. PATENT DOCUMENTS

2011/0194163 A1    8/2011  Shimizu et al.
2011/0304825 A1*  12/2011  Sieler ................. G02B 27/0101
                                                        353/20
(Continued)

FOREIGN PATENT DOCUMENTS

JP        2006019027 A    1/2006
JP        2008068766 A    3/2008
(Continued)

OTHER PUBLICATIONS

U.S. Appl. No. 15/312,784, filed Nov. 21, 2016, Nambara.

*Primary Examiner* — Nan-Ying Yang
(74) *Attorney, Agent, or Firm* — Harness, Dickey & Pierce, P.L.C.

(57) ABSTRACT

An illumination unit includes a plurality of sets of illumination modules each having a light source placed at a conjugate position and a plurality of stages of condenser lenses that collect light from the light source toward a display device, a magnifying optical system being between the conjugate position and a viewing area. Each illumination module set includes an initial stage lens closest to the light source and a final stage lens farthest from the light source. In a surrounding illumination module of the illumination module sets, principal points of all stages of condenser lenses are positioned on a surrounding principal ray that passes through a periphery of an angle of view center of the display device to reach the viewing area, and the light source is positioned on the surrounding principal ray by being offset from a light axis of the initial stage lens in the reference direction.

10 Claims, 9 Drawing Sheets

(52) U.S. Cl.
CPC ......... *B60K 2350/2052* (2013.01); *B60K 2350/352* (2013.01); *G02B 2027/0118* (2013.01); *G02B 2027/0145* (2013.01)

(56) References Cited

U.S. PATENT DOCUMENTS

2014/0022645 A1* 1/2014 Matsuura ........... G02B 27/0101
359/626
2016/0147061 A1 5/2016 Nambara

FOREIGN PATENT DOCUMENTS

| | | | |
|---|---|---|---|
| JP | 2009169399 | A | 7/2009 |
| JP | 2013130061 | A | 7/2013 |
| WO | WO-2010-061835 | A1 | 6/2010 |
| WO | WO-2015107883 | A1 | 7/2015 |

* cited by examiner

HEAD-UP DISPLAY DEVICE AND ILLUMINATION UNIT FOR HEAD-UP DISPLAY DEVICE

CROSS-REFERENCE TO RELATED APPLICATIONS

This application is a U.S. National Phase Application under 35 U.S.C. 371 of International Application No. PCT/JP2015/002759 filed on Jun. 1, 2015 and published in Japanese as WO 2015/190060 A1 on Dec. 17, 2015. This application is based on and claims the benefit of priority from Japanese patent application No. 2014-118742 filed on Jun. 9, 2014. The entire disclosures of all of the above applications are incorporated herein by reference.

TECHNICAL FIELD

The present disclosure relates to a head-up display device and an illumination unit for a head-up display device.

BACKGROUND ART

Conventionally, head-up display devices (hereinafter, "HUD device") are widely known. One type of HUD device projects a display image which is formed by a display and enlarged by a magnifying optical system onto a display member of a moving body, thereby displaying a virtual image of the display image to be viewable in a viewing area within the moving body.

In such a HUD device, an illumination unit transmits illumination through the display device and causes the light of the display image to reach the viewing area. For example, Patent Literature 1 describes a configuration for such an illumination unit. This illumination unit includes a multi-stage condenser lens that collects emitted light from a light source toward the display device. This multistage condenser lens includes an initial stage condenser lens, a mid stage lenticular lens, and a final stage condenser lens.

PRIOR ART LITERATURE

Patent Literature

Patent Literature 1: JP 2009-169399 A

SUMMARY OF THE INVENTION

According to the configuration of the illumination unit of Patent Literature 1, in order to increase the illumination efficiency when imaging the light from each of the plurality of light sources onto the viewing area, each light source must be positioned at a conjugate position which is conjugate with the viewing area. The magnifying optical system is positioned between the viewing area and the conjugate position. Here, the various stages of condenser lenses in the illumination unit of Patent Literature 1 are configured as an integrally formed lens array including a plurality of initial stage condenser lenses and a plurality of mid stage lenticular lenses. However, an equal number of condenser lenses as light sources are provided, whereas more lenticular lenses than light sources are provided. Due to this difference in numbers, there is a concern it may not be possible to position both the principal point of the condenser lens and the principal point of the lenticular lens on a peripheral principal ray that passes from each light source through the peripheries of the angle of view center of the display device. In this case, the image forming positions of the light from each light source on the viewing area may deviate from each other, and there is a concern this may create unevenness in the brightness of the virtual image of the display image as viewed in this viewing area.

In view of the above discussion, it is an object of the present disclosure to provide an illumination unit that reduces unevenness in the brightness of a virtual image of a display image in a HUD device, and to provide a HUD device including such an illumination unit.

In a first disclosed aspect, an illumination unit for a HUD device that projects a display image, which is formed by a display device and enlarged by a magnifying optical system, onto a display member of a moving body to display a virtual image of the display image in a viewable manner at a viewing area inside the moving body, the illumination unit causing the light of the display image to illuminate through the display device to reach the viewing area, includes a plurality of sets of illumination modules arranged along a particular reference direction, each set of the illumination modules including a light source, which emits light, positioned at a conjugate position which is conjugate to the viewing area, the magnifying optical system being between the conjugate position and the viewing area, and a plurality of stages of condenser lenses that collect the light from the light source toward the display device, where each set of the illumination modules includes at least an initial stage lens in the condenser lenses, the initial stage lens being positioned closest to the light source, and a final stage lens in the condenser lenses, the final stage lens being positioned farthest from the light source, and one set of the illumination modules among the plurality of sets of the illumination modules is a center illumination module, in which focal points of all stages of the condenser lenses from the initial stage lens to the final stage lens are positioned on a center principal ray that passes through an angle of view center of the display device to reach the viewing area, and the light source is positioned on the center principal ray by being aligned with a light axis of the initial stage lens, and a remaining set of the illumination modules among the plurality of sets of the illumination modules is a surrounding illumination module, in which focal points of all stages of the condenser lenses are positioned on a surrounding principal ray that passes through a periphery of the angle of view center of the display device to reach the viewing area, and the light source is positioned on the surrounding principal ray by being offset from a light axis of the initial stage lens in the reference direction.

In this configuration, the plurality of sets of illumination modules along the reference direction collect light from the light source positioned at the conjugate position which is conjugate to the viewing area, the magnifying optical system being between the conjugate position and the viewing area, and directs this light toward a display device using respective multiple stages of condenser lenses. According to each illumination module set implemented with this light collection configuration, an equal number of each stage of the condenser lenses is provided for each of the plurality of light sources. The condenser lenses include at least the initial stage lens which is closest to the light source and the final stage lens which is the farthest from the light source.

According to this first aspect, in the center illumination module which is one of the sets of illumination modules, the principal points of all stage of condenser lenses are positioned on the center principal ray along with the light source, the light source being aligned with the light axis of the initial stage lens. As a result, the light from the light source of the center illumination module passes through the angle of view center of the display to reach the viewing area on the center principal ray, and is imaged on this viewing area. In contrast, according to the first aspect, in the surrounding illumination module which is a remaining one of the sets of illumination modules, the principal points of all stages of condenser lenses are positioned on the surrounding principal ray along with the light source, the light source being offset from the light axis of the initial stage lens in the reference direction. As a result, the light from the light source of the surrounding illumination module passes through the periphery of the angle of view center of the display to reach the viewing area on the surrounding principal ray, and is imaged on this viewing area. At this time, the imaging position on the surrounding principal ray by the surrounding illumination module is suppressed from deviating with respect to the above described imaging position on the center principal ray by the center illumination module. Accordingly, the imaging positions by each illumination module set are also suppressed from deviating for those other than on the center principal ray and the surrounding principal ray. Accordingly, in the viewing area of the HUD device from the above described illumination unit, it is possible to reduce unevenness from occurring in the brightness of the virtual image of the display image.

Next according to a second disclosed aspect, a HUD device projects a display image, which is formed by a display device and enlarged by a magnifying optical system, onto a display member of a moving body to display a virtual image of the display image in a viewable manner at a viewing area inside the moving body, and includes the illumination unit according to the first place, the display device, and the magnifying optical system.

According to the HUD device of the second aspect, due to the illumination unit having at least the configuration of the first aspect, it is possible to reduce unevenness from occurring in the brightness of the virtual image of the display image in the viewing area.

EMBODIMENTS FOR CARRYING OUT INVENTION

Figure 1:
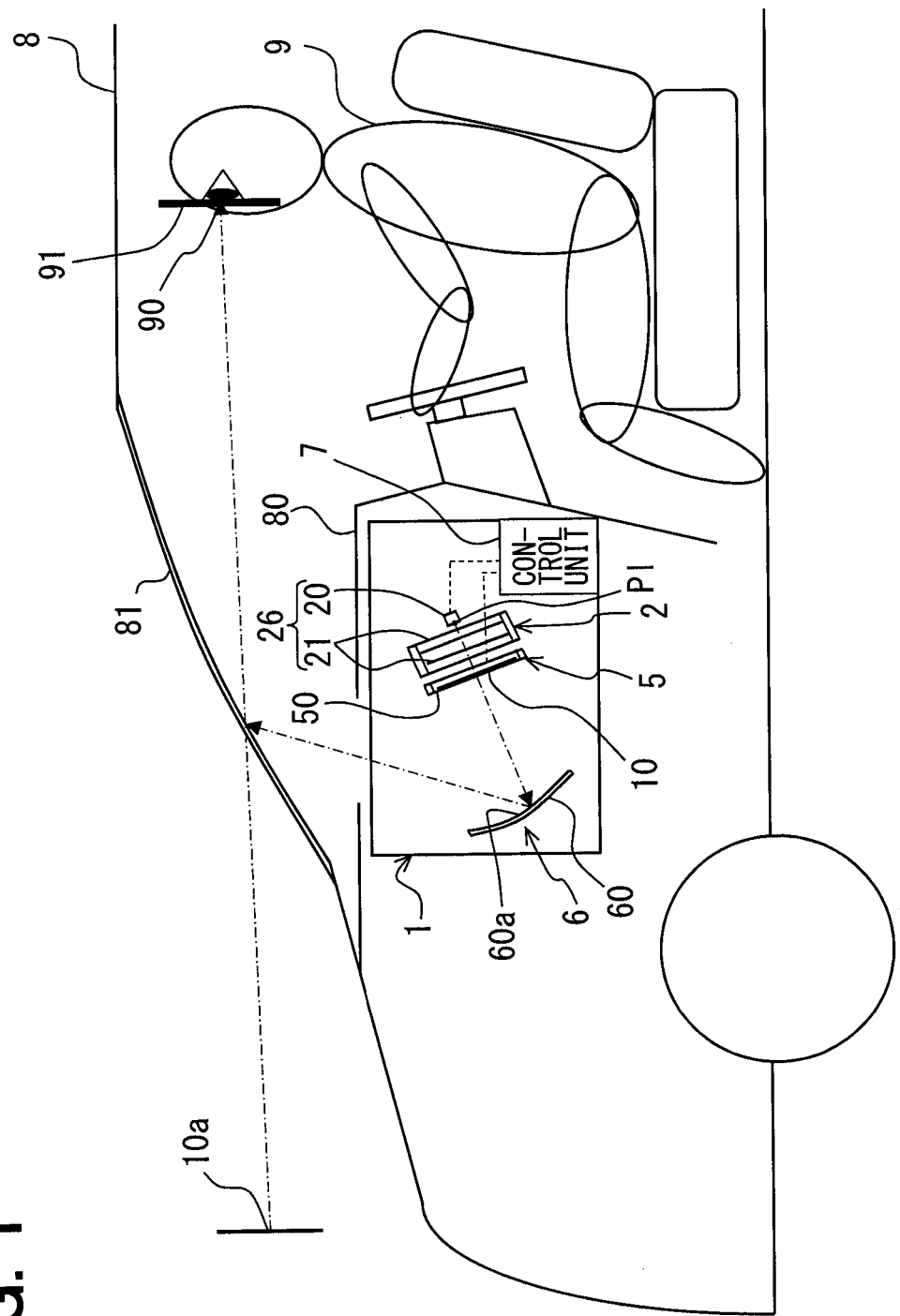
FIG. 1 is a configuration view showing a HUD device according to a first embodiment.

Next, a plurality of embodiments of the present disclosure will be explained with reference to the figures. Corresponding portions of each embodiment are denoted with the same reference numerals, and overlapping explanations may be omitted for brevity. If only a portion of the configuration of an embodiment is described, the configurations of previously described embodiments may be applied to the other portions of this configuration. The embodiments are not limited to combinations of portions which are specifically stated as being combinable. Instead, even without being stated, portions of embodiments may be combined with each other provided that no particular problem occurs for those combinations.

First Embodiment

As shown in FIG. 1, a HUD device 1 according to a first embodiment of the present disclosure is mounted on a vehicle 8, which corresponds to a "moving body", and is housed within an instrument panel 80. The HUD device 1 projects a display image 10 toward a windshield 81 of the vehicle 8. The windshield 81 corresponds to a "display member". As a result, within the cabin of the vehicle 8, the light of the display image 10 is reflected at the windshield 81 and arrives at an eye point 90 of a viewer 9. The viewer 9 perceives the light arriving at the eye point 90, and as a result views a virtual image 10a of the display image 10 ahead of the windshield 81. The viewing of this virtual image 10a is confined to when the eye point 90 is positioned in a viewing area 91 inside the vehicle 8. In other words, if the eye point 90 is outside of the viewing area 91, it may be difficult for the viewer 9 to view the virtual image 10a.

The HUD device 1 includes an illumination unit 2, a display device 5, and a magnifying optical system 6. In addition, the HUD device 1 may include a display control unit 7.

Figure 2:
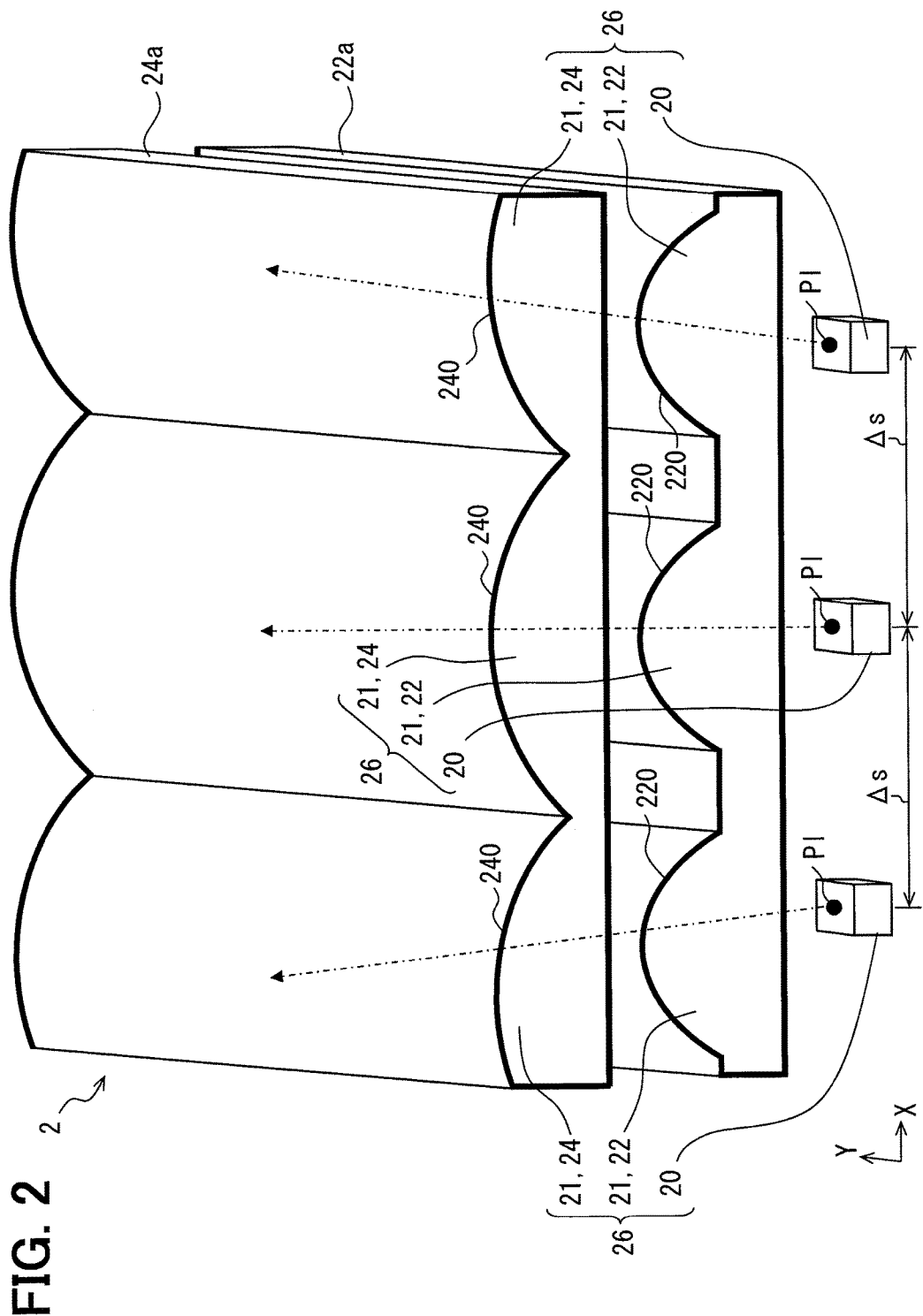
FIG. 2 is a perspective view showing an illumination unit according to a first embodiment.
Figure 3:
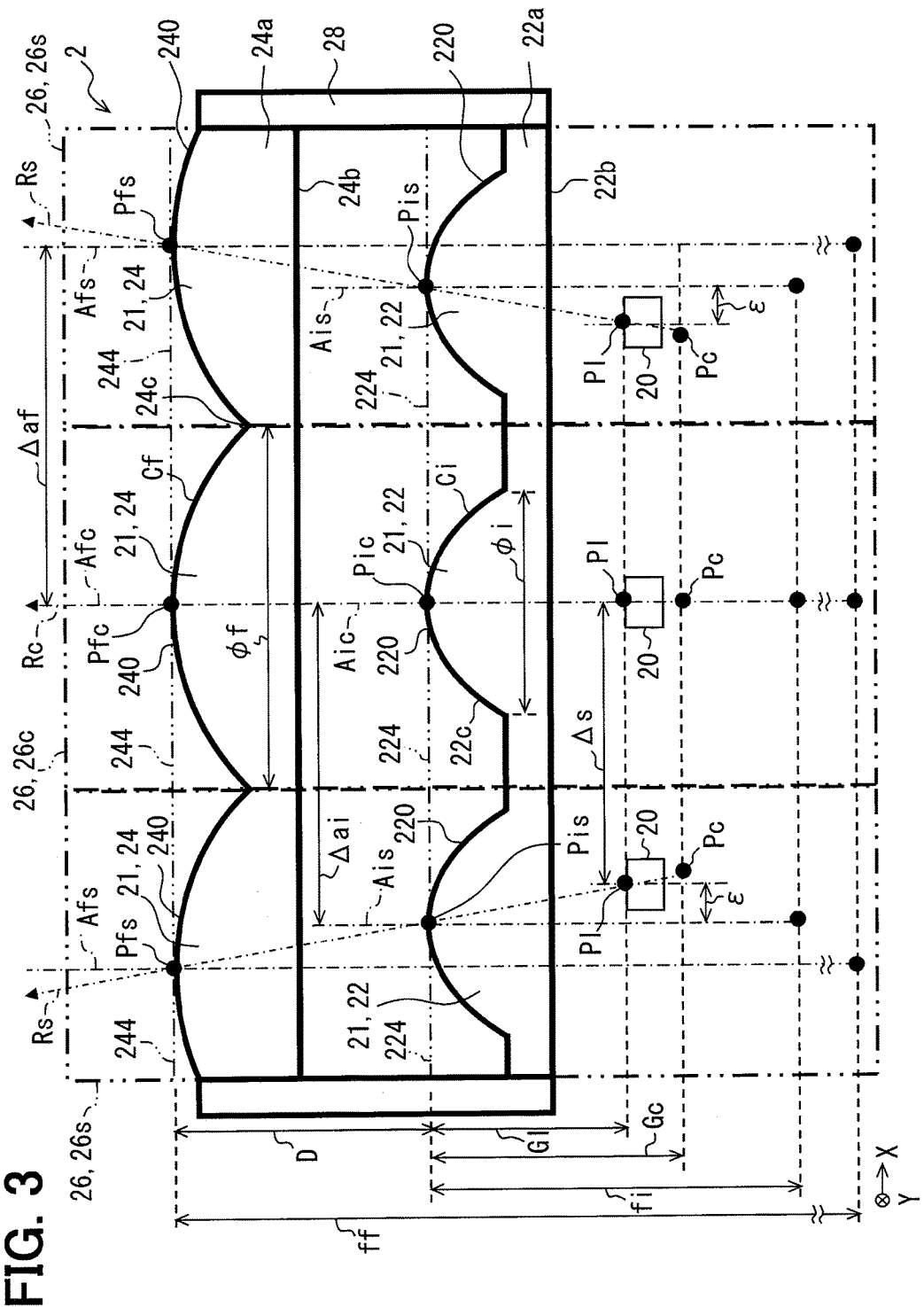
FIG. 3 is a front view showing an illumination unit according to a first embodiment.

The illumination unit includes a plurality of illumination modules 26, as shown in FIGS. 2 and 3. Each illumination module 26 is formed as a set of one light source 20 and multiple stages of condenser lenses 21. In the present embodiment, three sets of illumination modules 26 each include two stages of condenser lenses 21. In each set, an initial stage lens 22 is disposed closest to the light source 20 of that set, and a final stage lens 24 is disposed farthest from the light source 20 of that set. Accordingly, the illumination unit 2 includes three of each of a light source 20, an initial stage lens 22, and a final stage lens 24.

The light source 20 in each set of illumination modules (hereinafter, referred to as "each illumination module set") 26 is a point source of light emission such as, for example, light-emitting diodes (LED). The light source 20 is positioned at a conjugate position Pl (see FIG. 1) which is conjugate to the viewing area 91. The magnifying optical system 6 is positioned between the conjugate position Pl and the viewing area 91. The light source 20 in each illumination module set 26 emits light upon being energized to radiate, for example, white light.

The initial stage lens 22 in each illumination module set 26 is integrally formed of a light-transmissive material such as resin or glass, and together configure an overall rectangular board shaped initial stage lens array 22a. The initial stage lens 22 in each illumination module set 26 includes an initial stage lens surface 220 provided with the maximum positive power among a respective set of condenser lenses 21, and thereby collects a portion of the light emitted from the light source 20 of the same set.

The final stage lens 24 in each illumination module set 26 is integrally formed of a light-transmissive material such as resin or glass, and together configure an overall rectangular board shaped lens array 24a. The final stage lens 24 is each illumination module set 26 includes a final stage lens surface 240 provided with a smaller positive power than that of the initial stage lens 22 of the same set, and thereby collects light from the light source 20 after passing through that initial stage lens 22. Due to this light collecting function, the light from the light source 20 of each illumination module set 26 passes through the display device 5 and the magnifying optical system 6 shown in FIG. 1, and is formed as an image in the viewing area 91. At this time, the final stage lens 24 of each illumination module set 26 adjusts the image formation location in the viewing area 91 for the light from the light source 20 of the same set.

The display device 5 is an image display panel such as, for example, a dot matrix type TFT liquid crystal panel. The display device 5 includes a rectangular screen corresponding to the final stage lens array 24a (see FIG. 2). By driving a plurality of image pixels included in the screen 50, the display device 5 forms a display image 10 on this screen 50. The display image 10 may be, for example, a monochrome image or a color image. The light collected by the final stage lens 24 is transmitted from each illumination module set 26 to the screen 50 and allowed to illuminate through the screen 50. Here, according to the screen 50, the illumination target areas for the light from each illumination module set 26 are offset from each other, and as a result the entire region of the screen 50, which is a wide area, may be illuminated. By receiving illumination in this manner, the display device 5 luminescently displays the display image 10 on the screen 50. Further, this display image 10 is luminescently displayed as an optical image showing, for example, vehicle-related information such as traveling speed, traveling direction, and warnings.

The magnifying optical system 6 is primarily formed of a single concave mirror 60. The concave mirror 60 includes a reflection surface 60a, which may be formed by depositing a metallic reflection film, such as aluminum, onto a substrate, such as resin or glass. The concave mirror 60 has a reflective property whereby the reflection surface 60a reflects light emitted from the screen 50 of the display device 5. Due to this property, the concave mirror 60 guides the reflected light toward the windshield 81. As a result of this guidance, the display image 10 on the screen 50 is enlarged and projected onto the windshield 81. Consequently, the virtual image 10a of the display image 10 is displayed at the viewing area 91 in the vehicle 8, and is viewable by the viewer 9. Accordingly, the viewing area 91 is a region determined by the specification and orientation of the concave mirror 60. It should be noted that the orientation of the concave mirror 60 may be adjustable so as to allow adjustment of the viewing area 91, or fixed so as to render the location of the viewing area 91 constant. Further, the magnifying optical system 6 may include a plurality of concave mirrors 60, or may include reflective mirrors or lenses other than the concave mirror 60.

The display control unit 7 is an electrical circuit such as a microcomputer, and is electrically connected to the display device 5 and the light source 20 of each illumination module set 26. Further, the display control unit 7 is connected to various sensors, other control units, etc. within the vehicle 8 to allow communication with these sensors and control units. The display control unit 7 controls the energization of each illumination module set 26 in accordance with vehicle-related information, thereby causing these light sources 20 to illuminate. In addition, the display control unit 7 drives the constituent pixels of the screen 50 in accordance with vehicle-related information to display the image 10 on the screen 50, and thereby displaying the virtual image 10a to the viewer 9.

(Detailed Configuration of Illumination Unit)

Next, the structure of each illumination module set 26 in accordance with the first embodiment will be described in detail.

Each illumination module set 26, as shown in FIGS. 2 and 3, lies along a particular reference direction X. This reference direction X substantially matches the longitudinal directions of each lens array 22a, 24a corresponding to the longitudinal direction of the screen 50 (see FIG. 1). In addition, an orthogonal direction Y with respect to the reference direction X substantially matches the short directions of each lens array 22a, 24a corresponding to the short direction of the screen 50.

The light sources 20 of each illumination module set 26 are arranged along the reference direction X and are spaced apart from each other. The light sources 20 of each illumination module set 26 are set with a constant value pitch $\Delta s$, which is a center-to-center distance in the reference direction X.

As shown in FIG. 3, an incident surface 22b of the initial stage lens array 22a is formed as a flat surface facing the light source 20 of each illumination module set 26 from a fixed distance away. An emitting surface 22c of the initial stage lens array 22a forms respective initial stage lens surfaces 220. The initial stage lens surfaces 220 are arranged along the reference direction X so as to configure the initial stage lens 22 of each illumination module set 26. In this regard, the initial stage lens surfaces 220 of each illumination module set 26 are formed on the emitting surface 22c, which is on an opposite side from the light source 20 of that same set. As a result, aberrations regarding the light from this light source 20 may be reduced.

The initial stage lens 22 of each illumination module set 26, which are lined up in the reference direction X and which include respective initial stage lens surfaces 220, have an inter-light axis distance $\Delta ai$ which is set to be greater than the pitch $\Delta s$ between fellow light sources 20. In addition, a principal plane 224 of the initial stage lens surfaces 220 of each illumination module set 26 is defined so as to include principal points Pic or Pis located at the vertices on light axes Aic or Ais. Accordingly, in each illumination module set 26, a fixed gap Gl is maintained between the principal plane 224 of the initial stage lens 22 and the light source 20 along the light axis Aic or Ais of that initial stage lens 22.

The initial stage lens surfaces 220 of each illumination module set 26 are, according to the present embodiment, formed as a cylindrical shaped (see FIG. 2), convex lens surface. Due to this, the initial stage lens surfaces 220 of each illumination module set 26 have the same lens profile as each other, this profile being symmetrical about their respective light axis Aic or Ais in the reference direction X. In addition, the initial stage lens surfaces 220 of each illumination module set 26 have, in a longitudinal section along the reference direction X, a particular effective radius $\phi i$ and a curvature Ci so as to be at least first order and second order differentiable on either side of their respective light axis Aic or Ais. In this regard, due to the effective radius $\phi i$ and the curvature Ci of the initial stage lens surfaces 220, a focal length fi of the initial stage lens 22 in each illumination module set 26 is set to be a positive value. Further, the initial stage lens surfaces 220 may be differentiable up to second order, or may be differentiable up to third order or above as well.

The final stage lens array 24a is attached to the initial stage lens array 22a through a lens frame 28. An incident surface 24b of the final stage lens array 24a is formed as a flat surface facing the emitting surface 22c of the initial stage lens array 22a from a fixed distance away. An emitting surface 24c of the final stage lens array 24a forms respective final stage lens surfaces 240. The final stage lens surfaces 240 are arranged along the reference direction X so as to configure the final stage lens 24 of each illumination module set 26.

The final stage lens 24 of each illumination module set 26 along the reference direction X, each of which includes a respective final stage lens surface 240, have an inter-light axis distance Δaf in the reference direction X. This inter-light axis distance Δaf is set to be greater than the inter-light axis distance Δai between fellow initial stage lenses 22 and the pitch Δs between fellow light sources 20. Further, a principal plane 244 of the final stage lens surface 244 in each illumination module set 26 is defined so as to include principal points Pfc or Pfs positioned on the vertices of light axes Afc or Afs. Accordingly, in each illumination module set 26, the final stage lens 24 maintains a fixed inter-principal plane distance D along the light axis Afc or Afs between the principal plane 224 and the principal plane 244.

The final stage lens surfaces 240 of each illumination module set 26 are, according to the present embodiment, formed as a cylindrical shaped (see FIG. 2), convex lens surface. Due to this, the final stage lens surfaces 240 of each illumination module set 26 have the same lens profile as each other, this profile being symmetrical about their respective light axis Afc or Afs in the reference direction X. In addition, the final stage lens surfaces 240 of each illumination module set 26 have, in a longitudinal section along the reference direction X, a particular effective radius φf and a curvature Cf so as to be at least first order and second order differentiable on either side of their respective light axis Afc or Afs. Further, the final stage lens surfaces 240 may be differentiable up to second order, or may be differentiable up to third order or above as well.

The effective radius φf of the final stage lens surfaces 240 in each illumination module set 26 is set to be greater than the effective radius φi of the initial stage lens surfaces 220. In addition, the curvature Cf of the final stage lens surfaces 240 in each illumination module set 26 is set to be smaller than the curvature Ci of the initial stage lens surfaces 220. Due to the effective radius φf and the curvature Cf of the final stage lens surfaces 240 being set in this manner, in each illumination module set 26, the final stage lens 24 is provided with a smaller positive power than the initial stage lens 22, and so the initial stage lens 22 has a maximum positive power. In addition, due to the effective radius φf and the curvature Cf of the final stage lens surfaces 240, in each illumination module set 26, a focal length ff of the final stage lens 24 is set to be a greater positive value than the focal length fi of the initial stage lens 22.

In each illumination module set 26 described above, it is assumed that a composite focal point Pc is the focal point of a composite lens formed of all stages of condenser lenses 21, from the initial stage lens 22 to the final stage lens 24. Under this assumption, Equation 1 shows a gap Gc between the composite focal point Pc and the principal plane 224 of the initial stage lens 22 along the light axis Aic or Ais. Here, in each illumination module set 26, since the right side of Equation 1 must be greater than 0, Equation 2 is satisfied. In addition, in each illumination module set 26, since the light source 20 is aligned with the conjugate position Pl with the magnifying optical system 6 between the conjugate position Pl and the viewing area 91, also is also satisfied using the gap Gc shown in Equation 1. In other words, in each illumination module set 26, a gap Gl between the light source 20 and the principal plane 224 of the initial stage lens 22 is set to be equal to or less than the gap Gc between the composite focal point Pc and the same principal plane 224.

$$Gc=(f\!f\!-\!D)/\{1+(f\!f\!-\!D)/fi\} \qquad \text{(Equation 1)}$$

$$f\!f\!-\!D>0 \qquad \text{(Equation 2)}$$

$$Gl \leq Gc \qquad \text{(Equation 3)}$$

Figure 4:
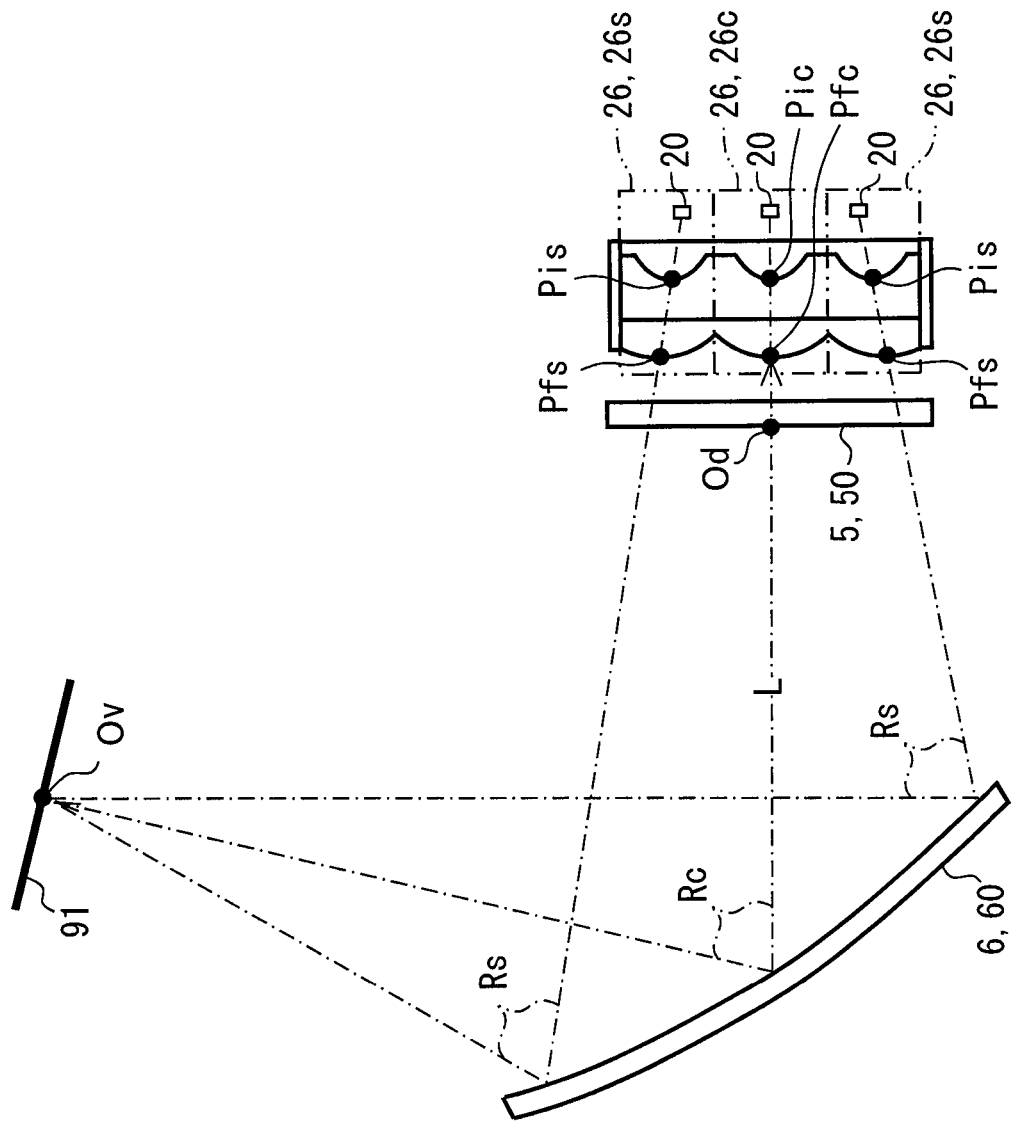
FIG. 4 is a schematic view for explaining an illumination unit according to a first embodiment.

In addition, one of the illumination module sets 26 shown in FIGS. 3 and 4 is configured as a center illumination module 26c where the principal points of all stages of the condenser lenses 21, i.e., the principal point Pic of the initial stage lens 22 and the principal point Pfc of the final stage lens 24, are positioned on a center principal ray Rc. As shown in FIG. 4, the center principal ray Rc is defined as passing through an angle of view center Od in the screen 50 of the display device 5, and travels from this angle of view center Od to reach a center position Ov of the viewing area 91. Here, according to the center illumination module 26c, the light source 20 is positioned on the center principal ray Rc in alignment with the light axis Aic of the first stage lens 22 as shown in FIG. 3. As a result, the light from this light source 20 is imaged onto the center position Ov of the viewing area 91 over the center principal ray Rc. Due to this arrangement, in the center illumination module 26c, the light axis Afc of the final stage lens 24 is also aligned with the light axis Aic of the initial stage lens 22.

In contrast, the remaining illumination modules sets 26 shown in FIGS. 3 and 4 are configured as surrounding illumination modules 26s where the principal points of all stages of the condenser lenses 21, i.e., the principal point Pis of the initial stage lens 22 and the principal point Pfs of the final stage lens 24, are positioned on surrounding principal rays Rs. As shown in FIG. 4, the surrounding principal rays Rs are defined as passing through the periphery of the angle of view center Od in the screen 50 of the display device 5, and travels from this periphery to reach the center position Ov of the viewing area 91. Here, according to the surrounding illumination modules 26s as shown in FIG. 3, the light sources 20 are positioned on the surrounding principal rays Rs which are offset from the light axes Ais of the initial stage lenses 22 in the reference direction X. As a result, the light from these light sources 20 is imaged onto the center position Ov of the viewing area 91 over the surrounding principal rays Rs.

Due to this arrangement, regarding all of the surrounding illumination modules 26s, the light source 20 is offset from the light axis Ais of the initial stage lens 22 by an offset distance ε. This offset distance ε satisfies Equation 4 according to the paraxial ray theory, which is a relational expression using each of the distances fi, ff, D, Δai, Δaf of the same set of surrounding illumination module 26s, along with a particular optical distance L. In this case, as shown in FIG. 4, the optical distance L is defined between the viewing area 91 and the principal plane 244 of the final stage lens 24 in the center illumination module 26c. In addition, according to all sets of the surrounding illumination modules 26s which satisfy this Equation 4, the light axes Afs of the final stage lenses 24 are offset with respect to the light axes Ais of the initial stage lenses 22 in a contrary direction as the light source 20 in the reference direction X.

$$\varepsilon=\{fi/(D+L-L^*D/f\!f)\}^*\{\Delta ai-L^*(\Delta ai-\Delta af)/f\!f\} \qquad \text{(Equation 4)}$$

(Operation Effects)

Next, the operation effects of the first embodiment as discussed thus far will be explained.

According to the first embodiment, each illumination module set 26 along the reference direction X collects light from the light source 20 positioned at the conjugate position Pl which is conjugate to the viewing area 91, the magnifying optical system 6 being between the conjugate position Pl and the viewing area 91, and directs this light toward a display device 5 using respective multiple stages of condenser lenses 21. According to the illumination unit 2 which is realized using each illumination module set 26 configured in this manner, an equal number of each stage of the condenser lenses 21 is provided for each of the plurality of light sources 20. The condenser lenses 21 include the initial stage lens 22 which is closest to the light source 20 and the final stage lens 24 which is the farthest from the light source 20.

According to the first embodiment, in the center illumination module 26c which is one of the illumination module sets 26, the principal points Pic, Pfc of all stage of condenser lenses 21 are positioned on the center principal ray Rc along with the light source 20, the light source 20 being aligned with the light axis Aic of the initial stage lens 22. As a result, the light from the light source 20 of the center illumination module 26c passes through the angle of view center Od of the display device 5 to reach the viewing area 91 on the center principal ray Rc, and is imaged on this viewing area 91. In contrast, in the surrounding illumination modules 26s which are the remaining ones of the illumination module sets 26, the principal points Pis, Pfs of all stages of condenser lenses 21 are positioned on the surrounding principal rays Rs along with the light sources 20, the light sources 20 being offset from the light axes Ais of the initial stage lenses in the reference direction X. As a result, the light from the light sources 20 of the surrounding illumination modules 26s pass through the periphery of the angle of view center Od of the display device 5 to reach the viewing area 91 on the surrounding principal rays Rs, and is imaged on this viewing area 91. At this time, the imaging position on the surrounding principal rays Rs by the surrounding illumination modules 26s is suppressed from deviating with respect to the above described imaging position on the center principal ray Rc by the center illumination module 26c. Accordingly, the imaging positions by each illumination module set 26 are also suppressed from deviating for those other than on the center principal ray Rc and the surrounding principal rays Rs.

Accordingly, according to the HUD device 1 of the first embodiment, due to the illumination unit 2 having the characteristics described above, it is possible to reduce unevenness from occurring in the brightness of the virtual image 10a of the display image 10 in the viewing area 91.

Further according to the first embodiment, the light from the light source 20 of the center illumination module 26c passes through the angle of view center Od of the display device 5 to reach the center position Ov of the viewing area 91 on the center principal ray Rc, and therefore may be imaged on this center position Ov. In contrast, according to the first embodiment, the light from the light sources 20 of the surrounding illumination modules 26s pass through the periphery of the angle of view center Od of the display device 5 to reach the center position Ov of the viewing area 91 on the surrounding principal rays Rs, and therefore may be imaged on this center position Ov. In this regard, by coinciding the image forming positions of the light from each illumination module set 26 on both the center principal ray Rc and the surrounding principal rays Rs, the imagine portion positions of each illumination module set 26 on those other than the center principal ray Rc and the surrounding principal rays Rs may also be made to coincide. Accordingly, the effect of reducing unevenness in the brightness of the virtual image 10a may be further improved.

Further according to the first embodiment, the gap Gl between the light source 20 and the principal plane 224 of the initial stage lens 22 in each illumination module set 26 is set to be equal to or less than the gap Gc between the same principal plane 224 and the composite focal point Pc of a composite lens combined from all stages of condenser lenses 21. Here, in each illumination module set 26, for any stage of the condenser lenses 21 described above, an equal number of corresponding light sources 20 are provided. As a result, each of the effective radius ϕi, ϕf and the focal length fi, ff of all stages of condenser lenses 21 may be reduced, and the gap Gc between the principal plane 224 and the composite focal point Pc of all these stages may also be reduced. As a result, in accordance with the gap Gc between the principal plane 224 and the composite focal point Pc becoming smaller, the gap Gl between the principal plane 224 and the light source 20 is also reduced. Accordingly, even while reducing the physical size of the illumination unit 2, the light from each light source 20 may be imaged at the viewing area 91 with an improved illumination efficiency, and at the same time unevenness in the brightness of the virtual image 10a, which would be especially noticeable due to being brightened by a high illumination efficiency, may be reduced.

Further, in each illumination module set 26 according to the first embodiment, the initial stage lens 22, which has the maximum positive power among the condenser lenses 21, may reliably collect as much light as possible from the light emitted by the nearby light source 20 toward the final stage lens 24 forming the latter part of the condenser lenses 21. Accordingly, the amount of light collected by each illumination module set 26 toward the display device 5 may be ensured, and so unevenness in the brightness of the virtual image 10a, which would be especially noticeable due to being brightened by a high illumination efficiency, may be reduced.

Further according to the first embodiment, among the two stages of condenser lenses 21 provided in each illumination module set 26, the initial stage lens 22 has the maximum positive power and therefore may reliably collect as much of the light as possible from the light emitted by the nearby light source 20. Further, among the two stages of condenser lenses 21 provided in each illumination module set 26, the final stage lens 24 has a light collecting function with respect to the light passing through the initial stage lens 22 from the light source 20, and thereby adjusts the image formation position of this light. Accordingly, the final stage lens 24 may prevent the image formation position of this light form deviating from the viewing area 91. Due to these points, even while greatly improving illumination efficiency to increase the brightness of the virtual image 10a, unevenness in the brightness of the virtual image 10a, which would be noticeable due to being brightened, may be reduced.

In addition, according to the first embodiment, the surrounding illumination modules 26s of the illumination module sets 26 satisfy Equation 4, which is a relational expression using the particular distances fi, ff, D, Δai, Δaf, L, and ε. Due to this, the light source 20 of each surrounding illumination module 26s may be accurately offset from the light axes Ais of the initial stage lenses 22 by the offset distance ε, and thereby be accurately positioned on the surrounding principal rays Rs. As a result, it is possible to reliably reduce unevenness in the brightness of the virtual image 10a in the viewing area 91.

Further according to the first embodiment, the initial stage lens 22 of each illumination module set 26 are combined with each other to form the initial stage lens array 22a, and the final stage lens 24 of each illumination module set 26 are combined with each other to form the final stage lens array 24a. In this regard, according to the initial stage lens array 22a and the final stage lens array 24a, when assembling the arrays, it is difficult for the relative positions on the center principal ray Rc and the surrounding principal rays Rs of the initial stage lens 22 and the final stage lens 24 in each illumination module set 26 to deviate. As a result, it is possible to prevent a situation where the imagine forming positions of the light from each light source 20 on the viewing area 91 deviates from each other due to a misalignment in these relative positions.

Second Embodiment

Figure 5:
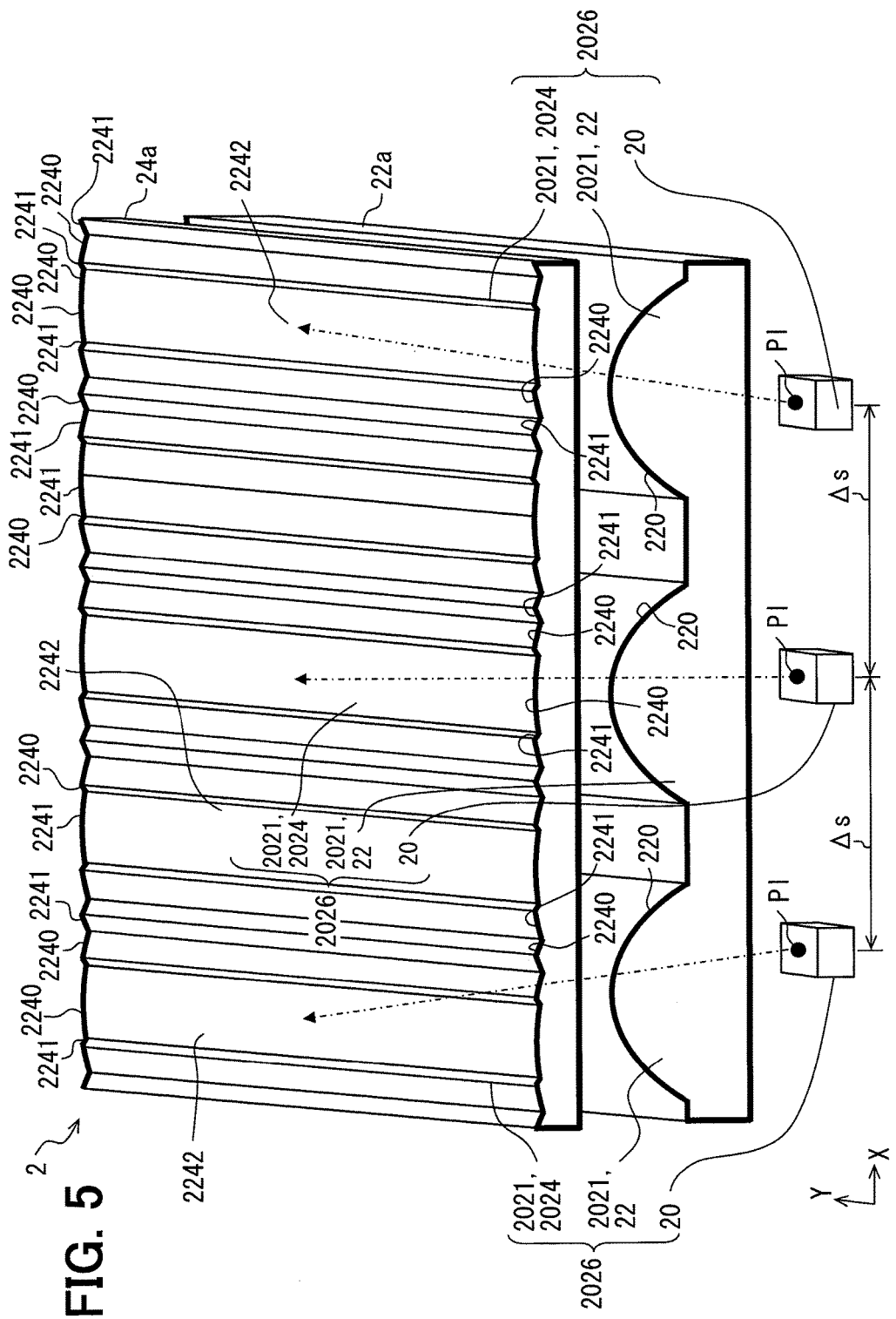
FIG. 5 is a perspective view showing an illumination unit according to a second embodiment.
Figure 6:
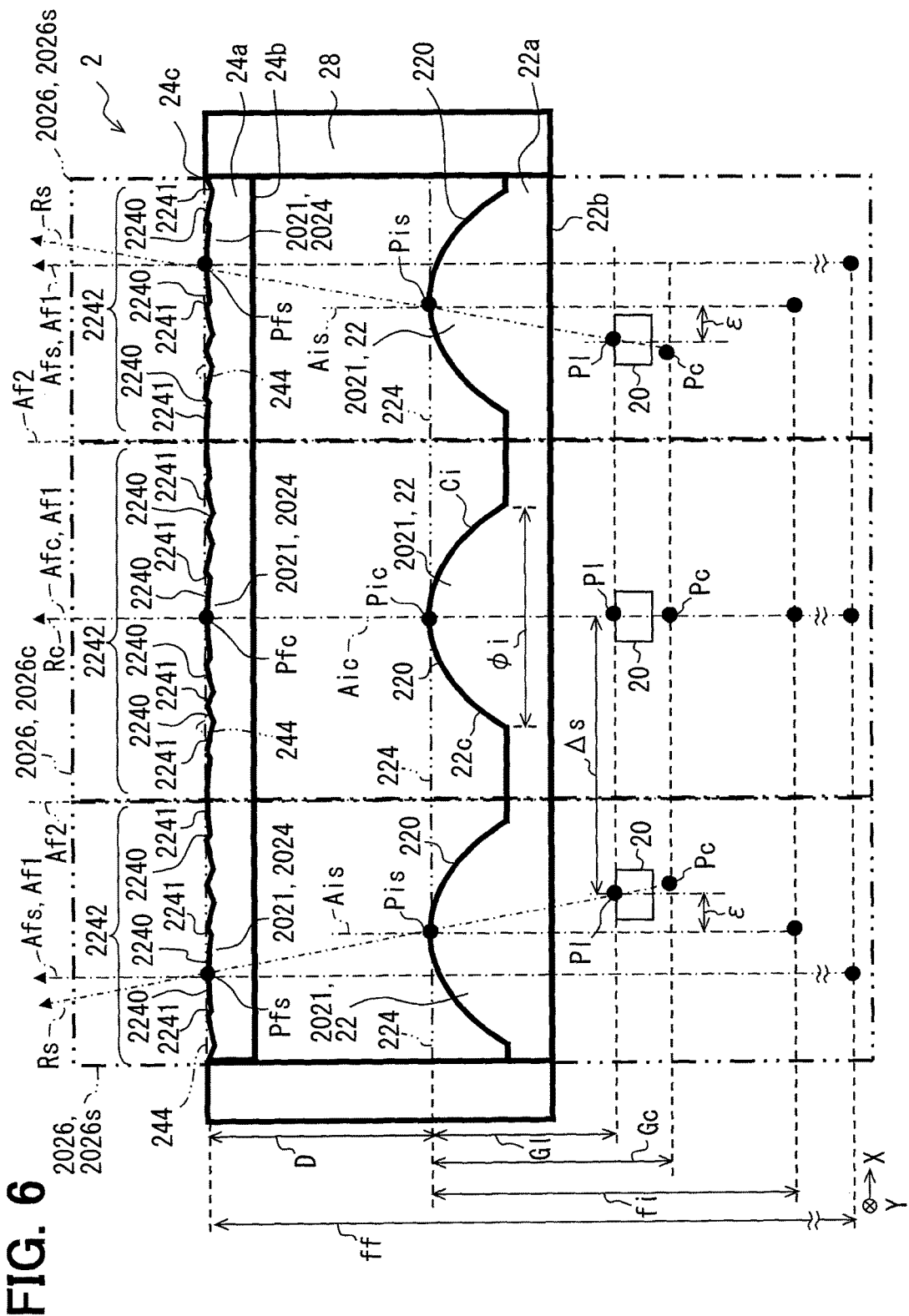
FIG. 6 is a front view showing an illumination unit according to a second embodiment.
Figure 7:
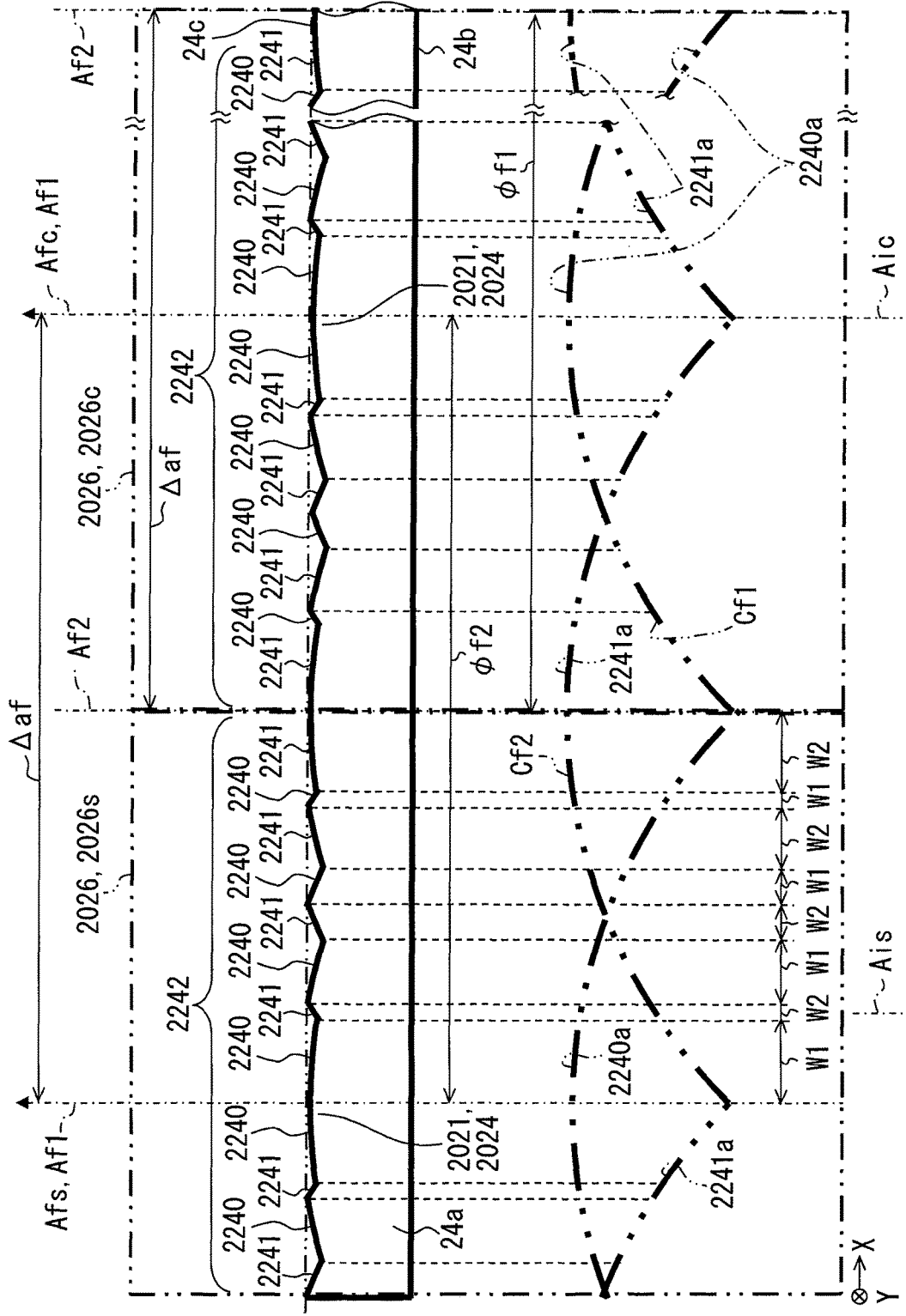
FIG. 7 is a schematic view for explaining an illumination unit according to a second embodiment.

A second embodiment of the present disclosure, as shown in FIGS. 5 to 7, is a modified example of the first embodiment. In the second embodiment, among two stages of condenser lenses 2021 of each illumination module set 2026, a final stage lens 2024 is at a later stage than the initial stage lens 22. This final stage lens 2024 includes final stage lens surfaces 2242 formed of a plurality of alternatingly arranged first lens surface portions 2240 and second lens surface portions 2241.

As shown in FIG. 7, the first lens surface portion 2240 of each illumination module set 2026 is formed to have a shape such that, under an assumption that there are a plurality of first imaginary lens surfaces 2240a, portions are intermittently extracted from a respective corresponding first imaginary lens surface 2240a as shown by the dotted lines in this figure. Further, in FIG. 7, two of three first imaginary lens surfaces 2240a, equal to the number of sets of illumination units 2026, are shown for representation.

Here, each first imaginary lens surfaces 2240a is imaginarily defined such that a respective individually corresponding one of light axes Afc, Afs, which are spaced apart from one another by an inter-light axis distance Δaf so as to pass through the principal points Pfc and Pfs (see FIG. 6), defines a first light axis Af1. Further, in the second embodiment, each first imaginary lens surface 2240a is defined as a cylindrical shaped convex lens surface. Due to this, each first imaginary lens surface 2240a has the same lens profile as each other, this lens profile being symmetrical about their respective first light axis Af1 in the reference direction X. In addition, each first imaginary lens surface 2240a has, in a longitudinal section along the reference direction X, a particular effective radius ϕf1 and a curvature Cf1 so as to be at least first order and second order differentiable between mutually adjacent first light axis Af1 and second light axis Af2 (described later). In addition, each first imaginary lens surface 2240a may be differentiable up to second order, or may be differentiable up to third order or above as well.

The second lens surface portion 2241 of each illumination module set 2026 is formed to have a shape such that, under an assumption that there are a plurality of second imaginary lens surfaces 2241a, portions are intermittently extracted from respective two corresponding second imaginary lens surface 2241a as shown by the dotted lines in FIG. 7. Further, in FIG. 6, three of the four second imaginary lens surfaces 2241a, one more than the number of sets of illumination units 2026, are shown for representation.

Here, each second imaginary lens surface 2241a is imaginarily defined such that a second light axis Af2 is defined at a middle position between first light axes Af1, Af1 in the reference direction X. Due to this, each second light axis Af2 extends parallel to each other with the inter-light axis distance Δaf between each other in the reference direction X. In addition, each second light axis Af2 is spaced away from each of the first light axes Af1, Af1 on either side in the reference direction X by half of this distance Δaf. That is, each second light axis Af2 is eccentric to the first light axes Af1, Aft on both sides in the reference direction X by half of the inter-light axis distance Δaf. In other words, the first imagine lens surfaces 2240a may be treated as an imaginary lens surface defined by offsetting the first light axis Af1 from the second light axis Af2 in the reference direction X.

Further, each second imaginary lens surface 2241a in the second embodiment is defined as a cylindrical shaped convex lens surface. Due to this, each second imaginary lens surface 2241a has the same lens profile as each other, this lens profile being symmetrical about their respective second light axis Af2 in the reference direction X. In addition, each second imaginary lens surface 2241a has, in a longitudinal section along the reference direction X, a particular effective radius ϕf2 and a curvature Cf2 so as to be at least first order and second order differentiable between mutually adjacent first light axis Af1 and second light axis Af2. In addition, each second imaginary lens surface 2241a may be differentiable up to second order, or may be differentiable up to third order or above as well.

Further, each second imaginary lens surface 2241a of the second embodiment has the same lens profile as each first imaginary lens surface 2240a. Due to this, the effective radius ϕf2 of each second imaginary lens surface 2241a is set to be equal to the effective radius ϕf1 of each first imaginary lens surface 2240a, within a range larger than the effective radius ϕi of the initial stage lens surfaces 220. In addition to this, the curvature Cf2 of each second imaginary lens surface 2241a is set to be equal to the curvature Cf1 of each first imaginary lens surface 2240a, within a range greater than the curvature Ci of the initial stage lens surfaces 220.

As shown in FIGS. 5 to 7 according to each illumination module set 2026, the number of extractions of the second lens surface portions 2241 from the second imaginary lens surfaces 2241a described above is set to be six or eight, equal to the number of extractions of the first lens surface portions 2240 from the first imaginary lens surfaces 2240a described above. Further, as shown in FIG. 7, in the reference direction X of each illumination module set 2026, an extraction width W1 of the first lens surface portions 2240 from the first imaginary lens surfaces 2240a is greater for the first lens surface portions 2240 which are closer to the first light axes Af1. Further, in the reference direction X of each illumination module set 2026, an extraction width W2 of the second lens surface portions 2241 from the second imaginary lens surfaces 2241a is greater for the second lens surface portions 2241 which are closer to the second light axes Af2.

Further as shown in FIGS. 6 and 7, on the first light axis Af1 of each illumination module set 2026, first lens surface portions 2240 are adjacent to each other in line symmetry. Further, on the second light axis Af2 of each illumination module set 2026, second lens surface portions 2241 are adjacent to each other in line symmetry.

According to each illumination module set 2026 including the final stage lens 2024 described above, by setting each imaginary lens surfaces 2240a, 2241a as described above, the final stage lens 2024 is provided with a smaller positive power than the initial stage lens 22. Consequently, in the second embodiment as well, among the condenser lenses 2021 in the same set, the initial stage lens 22 has the maximum positive power. Further, according to each illumination module set 2026, by setting each of the imaginary lens surfaces 2240a, 2241a, a focal length of the first imaginary lens surfaces 2240a is set as a focal length ff of the final stage lens 2024 as shown in FIG. 6, so as to be greater than the focal length fi of the initial stage lens 22.

In this regard, in each illumination module set 2026, the gap Gc between the principal plane 224 of the initial stage lens 22 and the composite focal point Pc is, similar to the first embodiment, represented by Equation 1. Here, the composite focal point Pc is of a composite lens combined from all stages of condenser lenses 2021, from the initial stage lens 22 to the final stage lens 2024. Further, according to each illumination module set 2026, similar to the first embodiment, since Equations 2 and 3 are satisfied, the gap Gc between the principal plane 224 and the light source 20 is equal to or less than the gap Gc between the principal plane 224 and the composite focal point Pc along the direction of the light axes Aic, Ais of the initial stage lens 22.

Further as shown in FIGS. 6 and 7, according to a center illumination module 2026c of the illumination module sets 2026, in which the principal points Pic, Pfc are positioned on the center principal ray Rc, the first light axis Af1 and the light source 20 are positioned on the center principal ray Rc in alignment with the light axis Aic of the initial stage lens 22. In addition, according to surrounding illumination modules 2026s of the illumination module sets 2026, in which the principal points Pis, Pfs are positioned on the surrounding principal rays Rs, the first light axis Af1 and the light source 20 are offset from the light axis Ais of the initial stage lens 22 in contrary directions of the reference direction X and are positioned on the surrounding principal rays Rs. As a result, in the surrounding illumination modules 2026s of the second embodiment as well, all sets satisfy Equation 4. Accordingly, at least the same operation effects of the first embodiment may be exhibited in the second embodiment.

In addition, according to the second embodiment, the final stage lens 2024 of each illumination module set 2026, i.e. any of the center illumination module 2026c and the surrounding illumination modules 2026s, includes the plurality of first lens surface portions 2240, each of which is formed by partial extraction from the first imaginary lens surface 2240a. The first imaginary lens surface 2240a is at least differentiable to the second order. As a result, in the center illumination module set 2026c, each first lens surface portion 2240 may exhibit a light collection function on the light from the light source 20, which is positioned on the light axis Aic of the initial stage lens 22 which is aligned with the first light axis Af1 of the first imaginary lens surface 2240a. In addition, in the surrounding illumination modules 2026s, each first lens surface portion 2240 may exhibit a light collection function on the light from the light source 20 after passing through the initial stage lens 22, this light source 20 being offset in a contrary direction as the first light axis Af1 of the first imaginary lens surface 2040a with respect to the light axis Ais of the initial stage lens 22.

In addition, according to the second embodiment, the final stage lens 2024 of each illumination module set 2026 includes a plurality of second lens surface portions 2241 arranged alternately with the first lens surface portions 2240 in the reference direction X. Each of the plurality of second lens surface portions 2241 is formed by partial extraction from the second imaginary lens surface 2241a, which is at least differentiable to the first order. As a result, in each illumination module set 2026, the light emitted from the second lens surface portions 2241 may be overlaid on top of the light emitted from the first lens surface portions 2240 between the light axes Af1, Af2 along the reference direction X, as well as on the second light axis Af2 defined by the second imaginary lens surface 2241a, the second light axis Af2 being eccentric to the first light axis Af1 in the reference direction X. Due to this light overlap function, even at locations spaced away from the first light axis Af1 in each illumination module set 2026, the intensity of the emitted light may be increased. Due to this, it is possible to reduce uneven illumination from occurring in the display device 5 between the illumination target area of each illumination module set 2026, and thus reduce unevenness in the brightness of the virtual image 10a.

Further, according to the second embodiment, the final stage lenses 2024 may be formed to be as thin as possible due to each final stage lens 2024 being formed by arranging the lens surface portions 2240, 2241, which are partially extracted from the imaginary lens surfaces 2240a, 2241a. Due to this, the inter-principal plane distance D between the initial stage lens 22 and the final stage lens 2024 may be set to be small, and the gap Gl, which is determined according to this distance D and which is equal to or smaller than the gap Gc, may also be set to be small. As a result, the physical size of the illumination unit 2 may be further reduced.

Other Embodiments

A plurality embodiments of the present disclosure are discussed above, the but the present disclosure is not to be interpreted as being limited to these embodiments. A variety of embodiments and combinations which do not depart from the gist of the present disclosure are contemplated.

Specifically, according to a first modified example related to the first and second embodiments, the initial stage lens surface 220 may be formed on the incident surface 22b of the initial stage lens array 22a in addition to, or in place of, the emitting surface 22c of the same lens array 22a. In this case, when forming the initial stage lens surface 220 on each of the emitting surface 22c and the incident surface 22b, a two-dimensional arrangement structure may be used in which a plurality of light sources 20 are arranged in along each of several different reference directions of these surfaces 22c, 22b.

According to a second modified example related to the first and second embodiments, the final stage lens surfaces 240, 2242 may be formed on the incident surface 24b of the final stage lens array 24a in addition to, or in place of, the emitting surface 24c of the same lens array 24a. In this case, when forming the final stage lens surfaces 240, 2242 on each of the emitting surface 24c and the incident surface 24b, a two-dimensional arrangement structure may be used in which a plurality of light sources 20 are arranged in along each of several different reference directions of these surfaces 24c, 24b.

According to a third modified example related to the first and second embodiments, regarding the condenser lenses 21, 2021 of each illumination module set 26, 2026, as long as the initial stage lens 22 and the final stage lens 24, 2024 are provided, three or more stages may be provided. For example, in the third modified example, a mid stage lens may be provided in the condenser lenses 21 and positioned between the initial stage lens 22 and the final stage lens 24, 2024. In this case, the gap Gl between the light source 20 and the principal plane 224 of the initial stage lens 22 is set to be equal to or less than the gap Gc between the same principal plane 224 and the composite focal point of all of these stages. Further, in this case as well, the mid stage lens of each illumination module set 26, 2026 may be formed as an integral mid stage lens array.

According to a fourth modified example related to the first and second embodiments, a later stage condenser lens 21 (for example, the final stage lens 24, 2024) may be provided with the maximum positive power rather than the initial stage lens 22 of the same set. Further, according to a fifth modified example related to the first and second embodiments, among the condenser lenses 21 which include the initial stage lens 22 and the final stage lens 24, 2024 of each illumination module set 26, 2026, at least one stage of condenser lens 21 may be provided separately from each other.

According to a sixth modified example related to the first and second embodiments, the gap Gl between the light source 20 and the principal plane 224 of the initial stage lens 22 in each illumination module set 26, 2026 may be set to be greater than the gap Gc between the same principal plane 224 and the composite focal point Pc of all stages of the condenser lenses 21. In the case of this sixth modified example, the structure of the magnifying optical system 6 is appropriately modified by, for example, attaching a convex lens to the concave mirror 60 such that the light source 20 of each illumination module set 26 is placed at the conjugate position Pl conjugate to the viewing area 91, the magnifying optical system 6 being between the viewing area 91 and the conjugate position Pl. Further, in the case of the sixth modified example, the inter-light axis distance Δai of the initial stage lenses 22 may be set to be smaller than the pitch Δs of the light sources 20, and the inter-light axis distance Δaf of the final stage lenses 24 may be set to be smaller than the inter-light axis distance Δai of the initial stage lenses 22 and the pitch Δs of the light sources 20.

Figure 8:
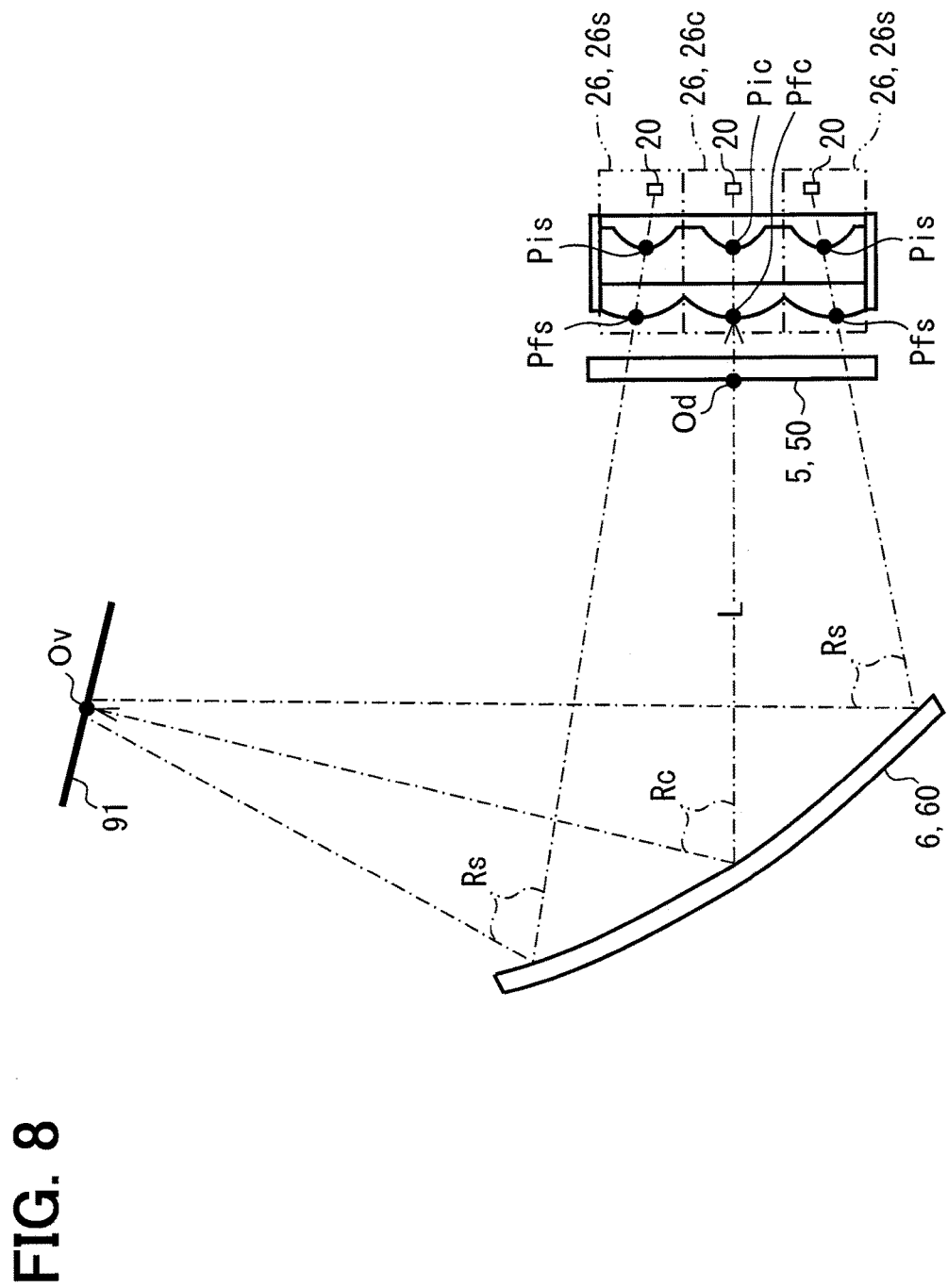
FIG. 8 is a schematic view for explaining a modified example of the first embodiment.

According to a seventh modified example related to the first and second embodiments, as shown in FIG. 8, the center principal ray Rc and the surrounding principal rays Rs may be defined so as to arrive in the vicinity of the center position Ov in the viewing area 91 within a measurement error range. In the case of the seventh modified example, the offset distance £ represented by Equation 4 changes slightly according to the measurement error of the center position Ov and the principal rays Rc, Rs.

Figure 9:
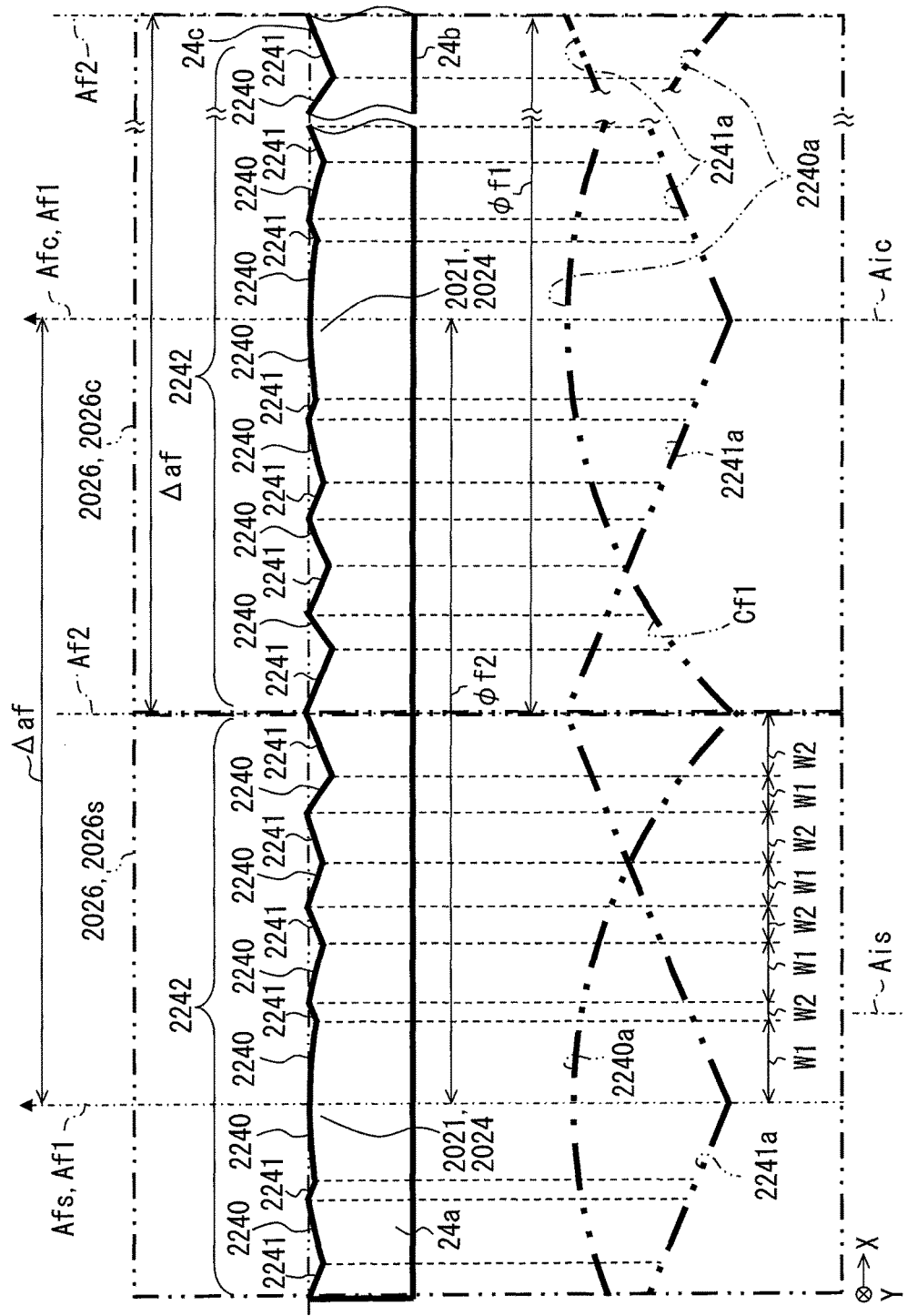
FIG. 9 is a schematic view for explaining a modified example of the second embodiment.

According to an eighth modified example related to the second embodiment, the lens profile of the first imaginary lens surface 2240*a* and the lens profile of the second imaginary lens surface 2241*a* may differ from each other. For example, in the eighth modified example, the curvature Cf1 of the first imaginary lens surface 2240*a* and the curvature Cf2 of the second imaginary lens surface 2241*a* may be different from each other. As an example, as shown in the eighth modified example of FIG. 9, the second imaginary lens surface 2241*a* may have a lens profile different from the first imaginary lens surface 2240*a* by being formed with a prism lens shape which inclines and declines in an angular fashion with respect to the reference direction X, this prism lens shape being only differentiable up to the first order in a longitudinal section along the reference direction X between the light axes Af1, Af2.

According to a ninth modified example related to the first and second embodiments, an element other than the windshield 81 may be used as the "display member" of the vehicle 8. For example, a combiner or such may be attached to the inside surface of the windshield 81, or a combiner may be provided separately from the windshield 81. Further, according to a tenth modified example related to the first and second embodiments, the present disclosure may be applied to an illumination unit 2 of a HUD device 1 mounted on a "moving body" other than the vehicle 8, such as a ship or an airplane.

What is claimed is:

1. An illumination unit for a head-up display device that projects a display image, which is formed by a display device and enlarged by a magnifying optical system, onto a display member of a moving body to display a virtual image of the display image in a viewable manner at a viewing area inside the moving body, the illumination unit causing the light of the display image to illuminate through the display device to reach the viewing area, the illumination unit comprising:
   a plurality of sets of illumination modules arranged along a particular reference direction, each set of the illumination modules including
      a light source, which emits light, positioned at a conjugate position which is conjugate to the viewing area, the magnifying optical system being between the conjugate position and the viewing area, and
      a plurality of stages of condenser lenses that collect the light from the light source toward the display device, wherein
   each set of the illumination modules includes at least an initial stage lens in the condenser lenses, the initial stage lens being positioned closest to the light source, and a final stage lens in the condenser lenses, the final stage lens being positioned farthest from the light source, and
   one set of the illumination modules among the plurality of sets of the illumination modules is a center illumination module, in which
      principal points of all stages of the condenser lenses from the initial stage lens to the final stage lens are positioned on a center principal ray that passes through an angle of view center of the display device to reach the viewing area, and
      the light source is positioned on the center principal ray by being aligned with a light axis of the initial stage lens, and
   a remaining set of the illumination modules among the plurality of sets of the illumination modules is a surrounding illumination module, in which
      principal points of all stages of the condenser lenses are positioned on a surrounding principal ray that passes through a periphery of the angle of view center of the display device to reach the viewing area, and
      the light source is positioned on the surrounding principal ray by being offset from a light axis of the initial stage lens in the reference direction, the light axis passing through a vertex of the initial stage lens.

2. The illumination unit for the head-up display device according to claim 1, wherein
   the center principal ray is defined so as to pass through the angle of view center of the display device to arrive at a center position of the viewing area, and
   the surrounding principal ray is defined so as to pass through the periphery of the angle of view center of the display device to arrive at the center position of the viewing area.

3. The illumination unit for the head-up display device according to claim 1, wherein
   in each set of the illumination modules, assuming a composite principal point of a composite lens combined from all stages of the condenser lenses from the initial stage lens to the final stage lens, a gap between the light source and a principal plane of the initial stage lens is set to be equal to or less than a gap between the principal plane of the initial stage lens and the composite principal point.

4. The illumination unit for the head-up display device according to claim 1, wherein
in each set of the illumination modules, the initial stage lens is the condenser lens provided with a maximum positive power.

5. The illumination unit for the head-up display device according to claim 4, wherein
each set of the illumination modules includes two stages of the condenser lens, the two stages of condenser lenses including the initial stage lens that collects the light from the light source with the maximum positive power, and the final stage lens that collects the light from the light source after passing through the initial stage lens to adjust an image forming position of this light.

6. The illumination unit for the head-up display device according to claim 5, wherein
the center principal ray is defined so as to pass through the angle of view center of the display device to arrive at a center position of the viewing area,
the surrounding principal ray is defined so as to pass through the periphery of the angle of view center of the display device to arrive at the center position of the viewing area, and
in the surrounding illumination module, the light source is offset with respect to the light axis of the initial stage lens by an offset distance c which satisfies a relational expression of $$\varepsilon=\{fi/(D+L-L*D/f\!f)\}*\{\Delta ai-L*(\Delta ai-\Delta af)/f\!f\}$$

using a focal length fi of the initial stage lens in the surrounding illumination module, a focal length ff of the final stage lens in the surrounding illumination module, an inter-principal plane distance D between the initial stage lens and the final stage length in the surrounding illumination module, an inter-light axis distance Δai of fellow ones of initial stage lens along the reference direction in the surrounding illumination module, an inter-light axis distance Δaf of fellow ones of the final stage lens along the reference direction in the surrounding illumination module, and an optical distance L between the viewing area and the principal plane of the final stage lens in the center illumination module.

7. The illumination unit for the head-up display device according to claim 5, wherein
in each set of the illumination modules, the final stage lens includes
a plurality of first lens surface portions each formed in a shape partially extracting from a first imaginary lens surface that defines a first light axis offset from a second light axis in the reference direction, the first imaginary lens surface being at least second order differentiable between the first light axis and the second light axis along the reference direction, and
a plurality of second lens surface portions each formed in a shape partially extracting from a second imaginary lens surface that defines the second light axis, the second imaginary lens surface being at least first order differentiable between the first light axis and the second light axis along the reference direction, the second lens surface portions being arranged alternately with the first lens surface portions along the reference direction,
in the center illumination module among the plurality of sets of the illumination modules, the light source and the first light axis are aligned with the light axis of the initial stage lens, and
in the surrounding illumination module among the plurality of sets of the illumination modules, the light source and the first light axis are offset in contrary directions from the light axis of the initial stage lens.

8. The illumination unit for the head-up display device according to claim 5, wherein
the initial stage lens in each set of the illumination modules together form an initial stage lens array and the final stage lens in each set of the illumination modules together form a final stage lens array, the final stage lens array combining with the initial stage lens array.

9. A head-up display device that projects a display image, which is formed by a display device and enlarged by a magnifying optical system, onto a display member of a moving body to display a virtual image of the display image in a viewable manner at a viewing area inside the moving body, comprising:
the illumination unit according to claim 1;
the display device; and
the magnifying optical system.

10. An illumination unit for a head-up display device that projects a display image, which is formed by a display device and enlarged by a magnifying optical system, onto a display member of a moving body to display a virtual image of the display image in a viewable manner at a viewing area inside the moving body, the illumination unit causing the light of the display image to illuminate through the display device to reach the viewing area, the illumination unit comprising:
a plurality of sets of illumination modules arranged along a particular reference direction, each set of the illumination modules including
a light source, which emits light, positioned at a conjugate position which is conjugate to the viewing area, the magnifying optical system being between the conjugate position and the viewing area, and
a plurality of stages of condenser lenses that collect the light from the light source toward the display device, wherein
each set of the illumination modules includes at least an initial stage lens in the condenser lenses, the initial stage lens being positioned closest to the light source, and a final stage lens in the condenser lenses, the final stage lens being positioned farthest from the light source, and
one set of the illumination modules among the plurality of sets of the illumination modules is a center illumination module, in which
principal points of all stages of the condenser lenses from the initial stage lens to the final stage lens are positioned on a center principal ray that passes through an angle of view center of the display device to reach the viewing area, and
the light source is positioned on the center principal ray by being aligned with a light axis of the initial stage lens, and
a remaining set of the illumination modules among the plurality of sets of the illumination modules is a surrounding illumination module, in which
principal points of all stages of the condenser lenses are positioned on a surrounding principal ray that passes through a periphery of the angle of view center of the display device to reach the viewing area, and
the light source is positioned on the surrounding principal ray by being offset from a light axis of the initial stage lens in the reference direction, wherein in each set of the illumination modules, the initial stage lens is the condenser lens provided with a maximum positive power, each set of the illumination modules includes two stages of the condenser lens, the two stages of condenser lenses including the initial stage lens that collects the light from the light source with the maximum positive power, and the final stage lens that collects the light from the light source after passing through the initial stage lens to adjust an image forming position of this light, the center principal ray is defined so as to pass through the angle of view center of the display device to arrive at a center position of the viewing area, the surrounding principal ray is defined so as to pass through the periphery of the angle of view center of the display device to arrive at the center position of the viewing area, and in the surrounding illumination module, the light source is offset with respect to the light axis of the initial stage lens by an offset distance ε which satisfies a relational expression of $$\varepsilon=\{fi/(D+L-L*D/ff)\}*\{\Delta ai-L*(\Delta ai-\Delta af)/ff\}$$

using a focal length fi of the initial stage lens in the surrounding illumination module, a focal length ff of the final stage lens in the surrounding illumination module, an inter-principal plane distance D between the initial stage lens and the final stage length in the surrounding illumination module, an inter-light axis distance Δai of fellow ones of initial stage lens along the reference direction in the surrounding illumination module, an inter-light axis distance Δaf of fellow ones of the final stage lens along the reference direction in the surrounding illumination module, and an optical distance L between the viewing area and the principal plane of the final stage lens in the center illumination module.

* * * * *